United States Patent [19]

Martin

[11] 4,321,835
[45] Mar. 30, 1982

[54] APPARATUS FOR MEASURING THE FLOW VELOCITY OF A FLUID

[75] Inventor: Robert Martin, Vienna, Austria

[73] Assignee: Alex Friedmann Kommanditgesellschaft, Vienna, Austria

[21] Appl. No.: 170,186

[22] Filed: Jul. 18, 1980

[30] Foreign Application Priority Data

Jul. 19, 1979 [AT] Austria .................................. 5008/79

[51] Int. Cl.³ .............................................. G01F 1/66
[52] U.S. Cl. .................................................. 73/861.28
[58] Field of Search ............ 73/861.28, 861.27, 861.18

[56] References Cited

U.S. PATENT DOCUMENTS 3,981,191 9/1976 Brown et al. ................. 73/861.28
4,011,755 3/1977 Pedersen et al. ............... 73/861.28

Primary Examiner—Stephen A. Kreitman
Attorney, Agent, or Firm—Watson, Cole, Grindle & Watson

[57] ABSTRACT

An apparatus for measuring fluid flow velocity includes an oscillation generator triggered by a circuit driver and a receiver which are disposed in oblique, opposed relation with respect to the direction of flow of the fluid, and an analyzing circuit for the determination of the transit time of the oscillations through the fluid, which analyzing circuit is made up by an exclusive OR-circuit connected on the input side of the receiver and to the oscillation generator operating with constant frequency and constructed as a square-wave impulse generator, a low-pass filter following it, and circuit means for detecting the differential value between a reference voltage and the voltage at the low-pass filter. The apparatus measures the phase-shift between the emitted and received signals, as a result of which a high accuracy is achieved even in case of short measuring distances and the apparatus can be constructed at very low costs.

3 Claims, 4 Drawing Figures

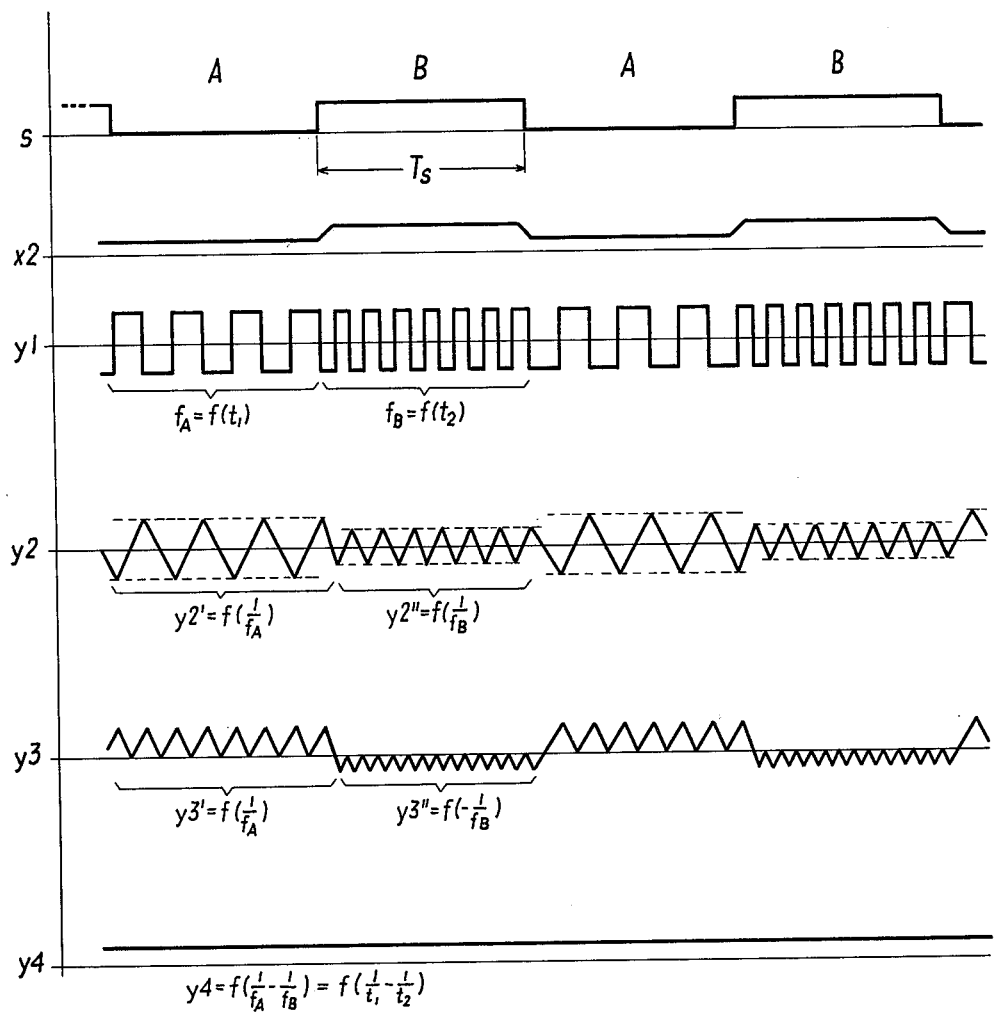

APPARATUS FOR MEASURING THE FLOW VELOCITY OF A FLUID

BACKGROUND OF THE INVENTION

The invention relates to an apparatus for measuring the flow velocity of a fluid, the apparatus including an oscillation generator triggered by a circuit driver and a receiver arranged in oblique opposed relation to the generator with respect to the direction of flow of the fluid, and an analyzing circuit for the determination of the transit time of the oscillations through the fluid.

German OS No. 2 351 290 describes a process wherein two reciprocal ultrasonic transducers, mutually opposed obliquely to the direction of the flow of the fluid, are alternatingly operated as transmitters and receivers and the time between the emission of a signal and the receipt of it is measured.

An arrangement for carrying out this process comprises an analyzing circuit in which a gate circuit is provided which is opened during the transit time of a signal, that is, the time between the emission of the signal and the receipt of it, and thereby establishes a connection between an oscillator and a back-and-forth counter. This back-and-forth counter is reversed in time of the reversal of the reciprocal ultrasonic transducer from forward to backward counters and vice versa. The differential value determined thus in the case of two successive measurements if fed to a storage device and is fed from the storage device in time to the reversal of the counter and of the ultrasonic transducers and via a digital analogue transducer to a display unit.

This known analyzing circuit not only has the disadvantage of a very high expenses regarding the circuit, but also that of an only very limited precision, especially in the case of shorter distances between the ultrasonic transducers. The latter drawback results from the pulse operation of the ultrasonic generators, whereby, because of the unavoidable build-up process, no precisely determinable pulse edges result and thus the point in time of the arrival in the case of the transducer, operated as a receiver, may not be precisely determined, and therefore errors result which, in the case of shorter distances between the ultrasonic transducers, lead to a considerable falsification of the measuring result.

The goal of the invention is to propose an apparatus of the initially mentioned type which is distinguished by a low construction cost and by a high precision.

SUMMARY OF THE INVENTION

According to the invention this will be achieved through the fact that the analyzing circuit is made up by an exclusive OR-circuit connected to the receiver and to the oscillation generator operating with a constant frequency and functioning as a rectangular pulse generator, a low-pass filter connected with said OR-circuit on the load side, as well as a circuit means for detecting the differential value between a reference voltage and the voltage of the low-pass filter. In this way the phase-shift between the emitted and received oscillation is determined as a result of which the above-mentioned disadvantages are avoided because the building-up processes will remain practically without effect and therefore a high precision will be achieved, even in the case of small distances between the oscillation generator and receiver, and a low circuit engineering expenditure will result.

During the attachment of the oscillation generator and of the one or several receivers, it is possible to assure that the oscillations are not transmitted directly to the pipe to avoid any mechanical oscillation conduction unrelated to the flow velocity of the fluid. It is furthermore also possible that in the analyzing circuit one member is provided which suppresses the influence of the oscillations transmitted by means of mechanical vibration conduction via the pipe to the receiver, which because that part of the oscillations differs both with respect to its amplitude as well as to its transit time from the part transmitted by way of the fluid.

In the case of the measurement of the flow velocity of media whose characteristics change greatly with regard to the transmission of oscillations, for example, at varying temperatures as is the case, for example, with gasses, difficulties will result whenever the voltage existing at the output of the low-pass filter which corresponds to the measured transit time, is compared with a predetermined reference voltage corresponding to a stored reference value. To avoid these difficulties a device according to the invention, wherein the oscillation generator and the receiver are built by reciprocal transducers which are alternately loadable, is provided with an electronic reversing device which alternately connects the square-wave impulse generator with one of the reciprocal transducers and the other one of the transducers with the exclusive OR-circuit, and the reversing device is controlled by the square-wave impulse generator by way of a frequency divider.

By these simple measures it is ensured that the reference voltage which is determined at every respective preceding measurement always corresponds to the physical characteristics of the fluid, so that changes of temperature or of pressure of the fluid which impede the capacity of the fluid for conducting sound, will have no effect on the measuring result. An additional increase in measurement precision will be achieved.

A very simple circuit for determining the differences between the reference voltage and the voltage exiting of the low-pass filter is characterized by the fact that it is reversible by a voltage-dependent oscillator following the low-pass filter and a rectifier arrangement connected with the oscillator, which is built of two rectifiers lying antiparallel to each other, which is connected with the frequency divider and is reversible in time with the reversing arrangement and which is followed by another low-pass filter.

The invention will now be explained in more detail with reference to the accompanying drawings.

DESCRIPTION OF THE DRAWINGS

FIGS. 3 and 4 show the voltages at various points in the block diagram according to FIG. 3.

DETAILED DESCRIPTION OF THE PREFERRED EMBODIMENT

Figure 1:
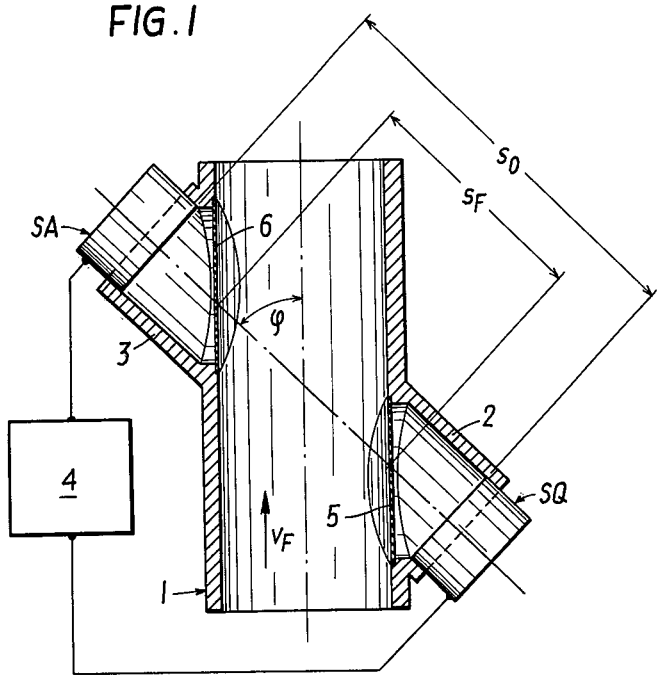
FIG. 1 shows partially in cross-section and partially in schematic the elements of the measuring apparatus according to the invention.

As can be seen from FIG. 1, the fluid whose velocity is to be measured will be caused to flow through a pipe 1 which is constructed to include adaptors 2, 3, the common axis of which encloses an angle $\varphi$ with the axis of the pipe 1. However, it is not necessary for the invention that these axes bisect each other, only that they cross over each other.

In the adaptors 2 and 3 an oscillation generator SQ, for example, an ultrasonic transducer, and a receiver SA are respectively positioned such that the oscillation generator SQ and the receiver SA are acoustically uncoupled from the pipe 1.

An analyzing circuit 4 is connected to the oscillation generator SQ and to the receiver SA, which circuit measures the transit time of the oscillations between the generator and the receiver and compares that time to a reference value, for example the transit time in the quiescent fluid medium.

The signal emitted by the oscillation generator SQ, which for example, is a continuous sinoid oscillation in the ultrasonic range, passes through a membrane 5 to the pipe 1 through which the fluid flows at the flow velocity of $v_F$ and subsequently passes through a further membrane 6 to reach the receiver SA. In the part of this traveled path which extends through the flowing fluid, the component of the flow velocity which extends in the direction of the propagation of the oscillations is added to the velocity in the quiescent fluid, so that the transit time of the signal is changed by the flowing fluid, for example, in comparison to the transit time through the quiescent fluid. The analyzing circuit 4 determines the transit time of the signal on the basis of the developing phase difference between the emitted and received oscillation. This determined transit time is compared in the analyzing circuit 4 with a reference value, and the flow velocity of the fluid is determined.

In case of comparison with the transit time in the quiescent medium, the following relationship is valid:

$$t = \frac{s_F}{v_F \cdot \cos \varphi + c_F} + \frac{s_o - s_F}{c_o}$$

$t$—transit time of the oscillation wave from SQ to SA
$s_o$—length of the path of the oscillation wave from SQ to SA
$s_F$—part of $s_o$ which passes in the flowing fluid
$c_F$—sound velocity in the fluid
$c_o$—sound velocity outside the fluid (for example, in air)
$v_F$—flow velocity of the fluid
$\varphi$—angle between the direction of flow of the fluid and the path of the oscillation wave from SQ to SA.

By a corresponding reformation of the above equation, the following results:

$$v_F = \frac{s_F - c_F(t - k)}{\cos \varphi (t - k)}, \quad \text{(I')}$$

whereby k has the value $$k = \frac{s_o - s_F}{c_o}$$

Numerical example:

| | |
|---|---|
| $s_o = 20$ cm | |
| $s_F = 10$ cm | |
| $\varphi = 25°$ | |
| $c_o = c_F = 333$ m/s | |
| (a) $v_F = 2$ m/s | $t = 598{,}975$ μs ... transit time in the flowing fluid |
| (b) $v_F = 0$ | $t = 600{,}600$ μs ... transit time in the quiescent fluid |

A flow of fluid with the velocity of $v_F = 2$ m/s therefore brings about a shortening of the transit time of the signal by $t = 1.625$ μs, which in the case of an oscillation frequency of 37 kHz becomes noticeable as a phase-shift of about 21 degrees and is therefore easily measured.

Figure 2:
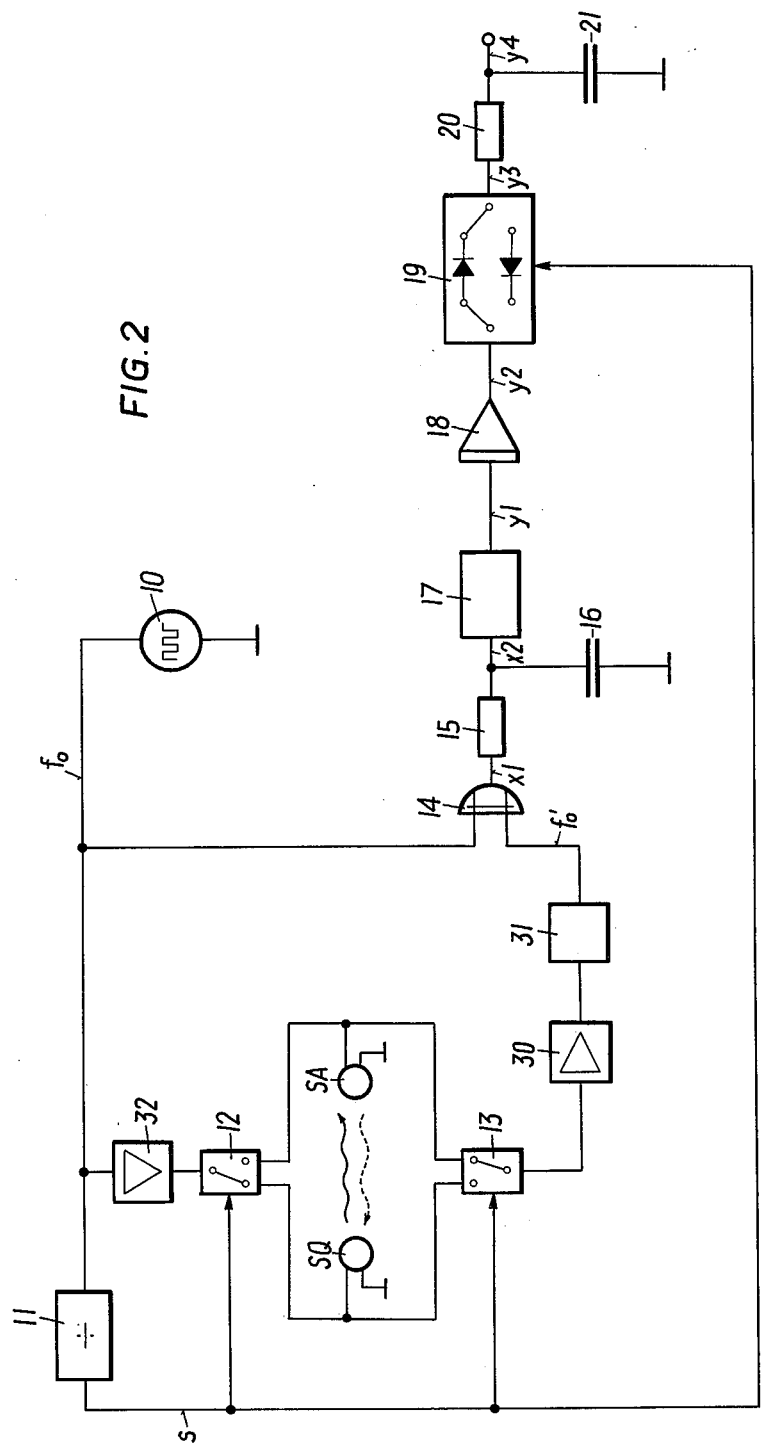
FIG. 2 shows a block diagram of an analyzing circuit according to the invention.

Besides the analyses described above, by a comparison of the measured transit time with the value of the transit time of the oscillations corresponding to the quiescent medium, it is also possible to measure the transit time of the oscillations in opposite directions and to determine the flow velocity of the fluid from the difference of the two transit times measured in two opposite directions. A block circuit diagram of an analyzing circuit operating according to this variation the invention is shown in FIG. 2.

When determining the flowing velocity of the fluid from two measurements of the transit time of the oscillations in the fluid made in mutually opposite directions, the following relationships pertain, the assumption being made that the velocity of sound in the fluid at rest in the media respectively located between the vibration exciter SQ or the receiver SA and the membranes 5 or 6 are equal; a condition which is full-filled very easily by filling the spaces between the transducers and the membranes 5, 6 with fluid flowing in the pipe.

$$t_1 = \frac{s_F}{c_F + v_F \cdot \cos \varphi} + \frac{s_o - s_F}{c_F} \quad \text{(I)}$$

$$t_2 = \frac{s_F}{c_F - v_F \cdot \cos \varphi} + \frac{s_o - s_F}{c_F} \quad \text{(II)}$$

From this results:

$$v_F = \frac{G + \sqrt{G^2 + \frac{s_o^2}{t_1 \cdot t_2}}}{\cos \varphi}$$

wherein the value of G is:

$$G = \frac{1}{2}\left\{ \frac{s_o}{2}\left[\frac{1}{t_1} - \frac{1}{t_2}\right] - \frac{2 \cdot s_o}{t_2 - t_1}\left[1 - \frac{s_o - s_F}{s_o} \cdot \frac{(t_1 + t_2)^2}{4 t_1 t_2}\right] \right\} \quad \text{(IV)}$$

If one assumes that $$\frac{s_o - s_F}{s_o} << \frac{4 t_1 t_2}{(t_1 + t_2)^2} \quad \text{(V)}$$

which may be achieved, for example, if the path from the generator to the receiver passes almost completely in the flowing fluid and that the rest of the length of the path lying outside is comparatively very short, the following approximation equation may be used for the determination of the flow velocity:

$$v_F = \frac{s_F}{2}\left(\frac{1}{t_1} - \frac{1}{t_2}\right) \quad \text{(VI)}$$

The circuit depicted in FIG. 2 works according to the relation (VI). This circuit consists essentially of a square-wave impulse generator 10, which delivers pulses with a frequency of, for example, 10 to 40 kHz, a frequency divider 11, which divides the frequency of the generator 10 at a rate of, for example, 1:100 and triggers the reversing switches 12, 13, for example Schmitt-Triggers, and exclusive OR-circuit 14 which connects the generator signals $f_o$ with the received signals $f_o'$ which have been formed and magnified via a selective magnifier 30 and a pulse former 31, as well as a low-pass filter 15, 16 following the exclusive OR-circuit 14, which produces an output (low-pass) voltage diagram x2, which is characteristic for the flow velocity of the fluid. This output voltage is converted in the embodiment shown by way of a voltage-controlled oscillator 17 which delivers square-wave impulses with variable frequency, by an integrator 18, a rectifier 19 controlled by the frequency divider 11, which has two branches lying antiparallel, which may be alternately loadable, or the polarity of which may be reversed at the output, as well as an additional low-pass circuit 20, 21 into a direct voltage signal y4, corresponding to the flow velocity.

The signals $f_o$ produced by the square-wave impulse generator 10 are supplied to the input of the exclusive OR-circuit 14, to the input of the power amplifier 32 and to the frequency divider 11. The output of the power amplifier 32 is connected with one of the two reciprocal transducers SQ, SA via the electronic reversing switch 12. The second of the two reciprocal transducers serves as a receiver and converts the incoming oscillations into electrical signals $f_o'$, which are supplied via the second electronic reversing switch 13 and the selective amplifier 30, as well as the pulse former 41, to the second input of the exclusive OR-circuit 14.

Figure 3:
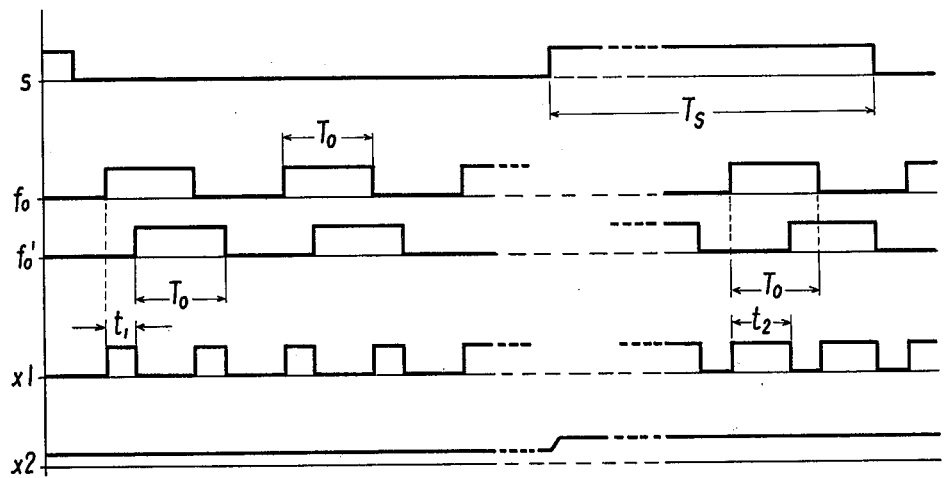

The train of pulses (FIG. 3) obtained from the output of the frequency divider 11 simultaneously reverses both electronic reversing switches 12, 13 at every change of potential so that two successive measurements of the transit time of the oscillations take place in mutually opposite directions, or the drive of the reciprocal transducers as a generator or receiver respectfully reversed. Whenever the oscillations are superposed on a flowing fluid, then, as shown in FIG. 3, phase shifts of variable size $t_1$ or $t_2$ result between the signals $f_o$ originating from the generator 10 and the received signals $f_o'$, both of which are interconnected by the exclusive OR-circuit 14. Therefore a pulse train x1 with twice the frequency of $f_o$ and variable scanning ratio appears at the outlet of the exclusive OR-circuit—depending on whether the oscillations are emitted obliquely in or obliquely against the direction of the flow of the fluid.

This pulse train x1 is smoothed by the low pass filter 15, 16, the time constant of which is considerably greater than the pulse duration $T_o$ of one pulse of the pulse train $f_o$, but smaller than the pulse duration $T_s$ of one pulse of the pulse train s, as a result of which the pulse train x2 is obtained (FIGS. 3, 4). The potential level of this pulse train fluctuates at constant flow speed of the fluid in the rhythm of the pulse train s, to which the circuit conditions A, B of the electronic reversing devices 12, 13, are assigned, because the reciprocal transducers are reversingly loaded as oscillation generator SQ is respectively connected with the oscillation generator 10 or the power amplifier 32.

This pulse train x2 is fed to the voltage-controlled oscillator 17, so that the frequency of its output pulses y1 changes with the rhythm of the potential changes of the pulse train x2. One frequency $f_A$ of the pulses y1 corresponds to the transit time $t_1$, and the other frequency $f_B$ to the transit time $t_2$. The pulses y1 supplied of the output of the voltage-controlled oscillator 17 are integrated by the following integrator 18, as a result of which the pulse train y2, showing approximately triangular pulses of variable frequency and amplitude, is obtained, the sections y2' and y2" of which correspond to the function $(1/f_A)$ or $(1/f_B)$. This pulse train y2 is rectified by means of the rectifier 19, having two rectifying sections lying antiparallel and controlled by the frequency divider 19 or its output impulses s. As a result of reversing the rectifier sections in the rhythm of the potential changes of the pulse train s, as can be seen from FIG. 4, the polarity at the output of the rectifier 19 is changed, whereby these changes correspond to the reversings of the transducers SQ, SA. The individual sections y3' and y3" of the pulse train 3, obtained thus, correspond to the functions $+(1/f_A)$ or $-(1/f_B)$. The pulse train y3 is fed to the low-pass circuit 20, 21 and is smoothed, whereby the time constant of the low-pass circuit 20, 21 is much greater than the duration $T_s$ of one pulse of the pulse train s, so that the output signal y4 of the low-pass 20, 21, corresponds to the function $$\left(\frac{1}{f_A} - \frac{1}{f_B}\right),$$

which in turn corresponds to the function $$\left(\frac{1}{t_1} - \frac{1}{t_2}\right)$$

stated in the equation (VI). The constant ($s_F/2$), stated in equation (VI) may easily be taken into consideration in the case of the correction of an instrument showing the signal y4.

To switch the reversing devices 12, 13, a frequency must be selected which is sufficiently low to establish by stages steady conditions for the transmission path and the measurement of phase shaft by means of the exclusive OR-circuit 14 and the low-pass 15, 16, but which is fast enough for the low-pass member 21, 20 for example a recording instrument, in order to prevent the successive separate recording of the results of the individual sections.

The value for the transit time in the quiescent medium may also be determined with slight changes by comparing the measurements of the transit time of the vibrations in mutually opposite directions and the flow velocity according to one of the two measurements to determine the velocity of flow according to the already explained formula (I').

Furthermore, it is also possible to evaluate measurements according to the formula (III) with the parameters according to the formula (IV), for which, however, the use of a microprocessor would be needed.

I claim:

1. Apparatus for the measurement of the flow velocity of a fluid which a vibration exciter triggered by a vibration generator, and a receiver are lying opposite each other and an analyzing circuit for determining the running time of the vibrations through the fluid is provided, characterized in that the analyzing circuit is made up of an exclusive OR-member (14) connected on the input side with the receiver (SA) and the vibration generator operating at constant frequency and developed as a rectangular pulse generator (10), and a low-pass filter (15, 16) following the OR-member, as well as of a circuit forming the differential value between a reference voltage and the voltage found at the low-pass filter (15, 16).

2. Apparatus as in claim 1, in case of which the vibration exciter and the receiver are formed by reciprocal converters, which may be acted upon alternatingly, characterized in that an electronic conversion device (12, 13) is provided, which connects the rectangular pulse generator (10) alternatingly with the exclusive OR-member (14) and which is controlled via a frequency divider (11) by the rectangular pulse generaor (10).

3. Apparatus as in claims 1 or 2, characterized in that the circuit forming the differential value is made up of a voltage-dependent oscillator (17) following the low-pass filter (15, 16) and of a rectifier arrangement (19) consisting of two rectifiers lying antiparallel and connected with the former, which arrangement is connected with the frequency divider (11) and may be reversible in time with the reversing arrangement (12, 13), which is followed by an additional low-pass filter (20, 21).

* * * * *